Patented Aug. 8, 1933

1,921,948

UNITED STATES PATENT OFFICE 1,921,948

OPTICAL CEMENT

Samuel E. Sheppard, Rochester, N. Y., assignor to Eastman Kodak Company, Rochester, N. Y., a Corporation of New York No Drawing. Application January 2, 1929
Serial No. 329,951

1 Claim. (Cl. 87—17)

This invention relates to cements for cementing optical glass.

The number of materials available for cementing lenses, flat plates and color filters is very limited since the requirements in the matter of color, adhesion to glass, refractive index, range in dispersive power, clarity and solidity at higher temperatures, prohibit the use of a large number of common adhesives. For this reason Canada balsam has been largely used for this purpose but even this material has certain disadvantages due to the fact that it is a product of nature and, therefore, varies widely in its characteristics, and for the further reason that since it is derived from various sources, it must be carefully refined in order to have the desired properties for use in optical instruments.

The present invention has for its purpose the production of a cement which satisfies the above requirements and which obviates the disadvantages encountered in the use of Canada balsam.

I have found that a satisfactory cement for optical glass can be made from the product of polymerization of vinyl acetate (termed poly vinyl acetate) or the product of the joint or simultaneous polymerization of vinyl acetate and vinyl chloride.

The preparation of the polymers of vinyl acetate may be carried out according to methods by Staudinger, Frey and Stark, Berichte, 60, 1782 (1927), and by Whitby, McNally and Gallay, Trans. Roy. Soc. Canada, section 111., 1928, p. 27.

Suitable products of joint or simultaneous polymerization may be obtained by taking mixtures consisting of from one-third of vinyl chloride with two-thirds of vinyl acetate or any smaller portion of vinyl chloride and polymerizing the said mixture.

The resulting substances vary in character from nearly viscous semi-solids to hard, glass-clear, white and somewhat brittle resins at ordinary temperatures. I have further found that the higher polymers are the most suitable for optical cement. The differentiation of high or low polymers may also be carried out by the method of fractionation and molecular weight determination as described in the above mentioned paper by Whitby, McNally and Gallay. For example, a higher polymer will contain fractions giving a molecular weight of the order of 5000 to 6000 in benzol or bromoform while a lower and softer polymer will not give a fraction having molecular weights higher than 1500.

These higher polymers may be used as an optical cement either by placing them in the form of a thin wafer or flakes between the lenses and causing the cement to flow by heat and pressure, the degree of heat being not greater than 300° F., or by preparing solutions of them in xylene or ethyl benzene, for example, a solution from 20 to 25% of poly vinyl acetate, or 20 to 25% of the product of the simultaneous polymerization of vinyl acetate and vinyl chloride, also in xylene or ethyl benzene. Part of the poly vinyl acetate or of the product of the simultaneous polymerization of vinyl acetate and vinyl chloride may be replaced by Canada balsam for example in the proportion of one part of Canada balsam to four parts of poly vinyl acetate or the other polymers. In addition to the solvents xylene or ethyl benzene certain softeners such as derivatives of tetra-ethylene glycol may be used as admixtures.

This cement is particularly adapted for manufacturing photographic objectives for use either in photography or projection such as in the projecting objective shown in the patent to Frederick et al. 1,620,339, granted March 8, 1927. This cement is particularly adapted for use in joining two pieces of optical glass together wherein the thickness of the film of cement is such that it will readily shear if the pieces of optical glass are broken, as distinguished from the use of such materials in thick layers. The thickness of the film of cement will usually not be greater than two hundredths (.02) of a milimeter.

What I claim is:

An optical cement including the higher polymers of a product of the simultaneous polymerization of vinyl acetate and vinyl chloride, and Canada balsam.

SAMUEL E. SHEPPARD.